Dec. 2, 1947.  R. N. BENNETT  2,431,727
TRANSMISSION
Filed Jan. 29, 1945  2 Sheets-Sheet 1

INVENTOR.
Robert N. Bennett
BY
Malcolm W. Price
ATTORNEY

Dec. 2, 1947.  R. N. BENNETT  2,431,727
TRANSMISSION
Filed Jan. 29, 1945  2 Sheets-Sheet 2

INVENTOR.
Robert N. Bennett
BY
ATTORNEY

Patented Dec. 2, 1947

2,431,727

UNITED STATES PATENT OFFICE 2,431,727

TRANSMISSION

Robert N. Bennett, Findlay, Ohio, assignor, by mesne assignments, to Gar Wood Industries, Inc., Detroit, Mich., a corporation of Michigan Application January 29, 1945, Serial No. 575,082

10 Claims. (Cl. 74—333)

1

This invention relates to trenching or ditching machines of the type employing a self-propelled vehicle, the power plant of which is operatively connected to drive the trenching or excavating mechanism during the advancing movement of the machine, and an object is to produce a new and improved power transmission for such machine by which the motive power is conveyed to both the traction mechanism and also the excavating or trenching mechanism, the structure being compactly arranged and so designed as to reduce the number of operating parts, thereby not only to increase the efficiency of the machine but to simplify and to improve the construction, arrangement and operation thereof.

Figure 1:
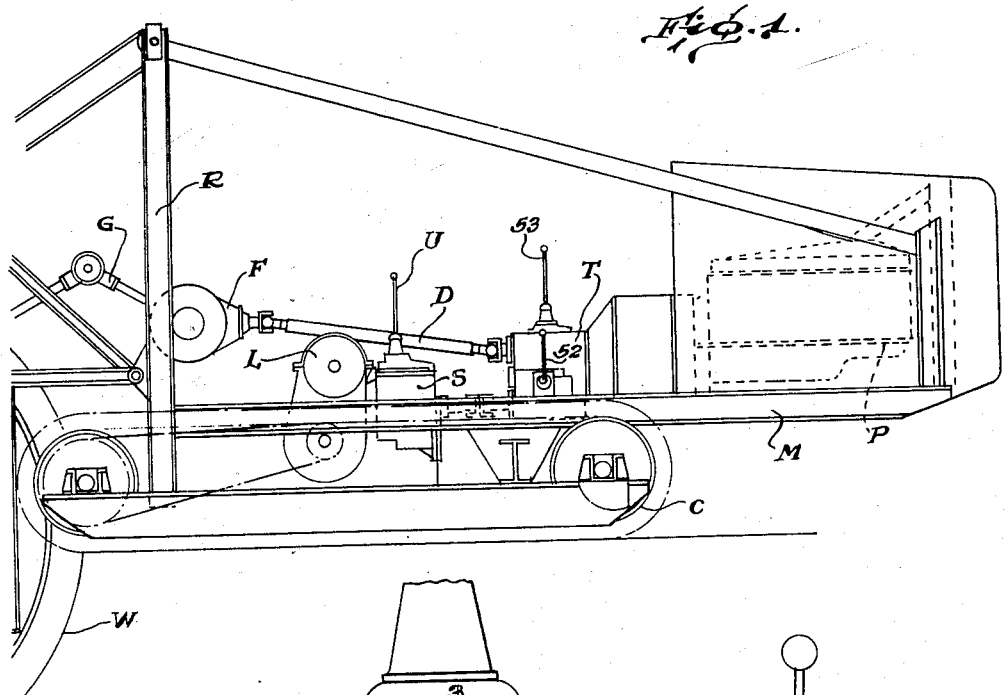
Figure 2:
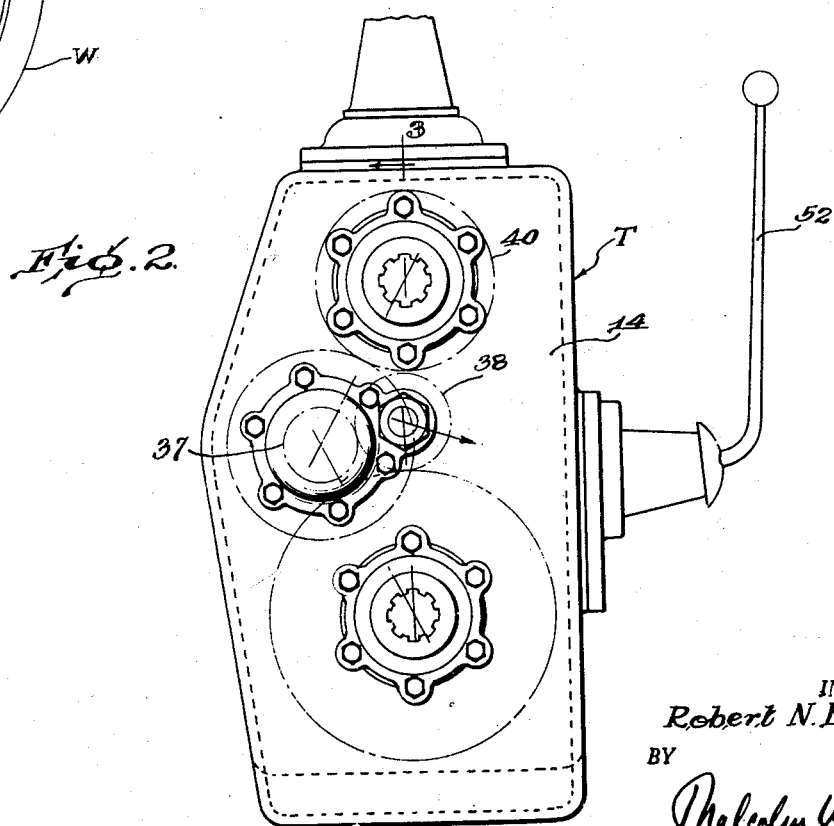
Figure 3:
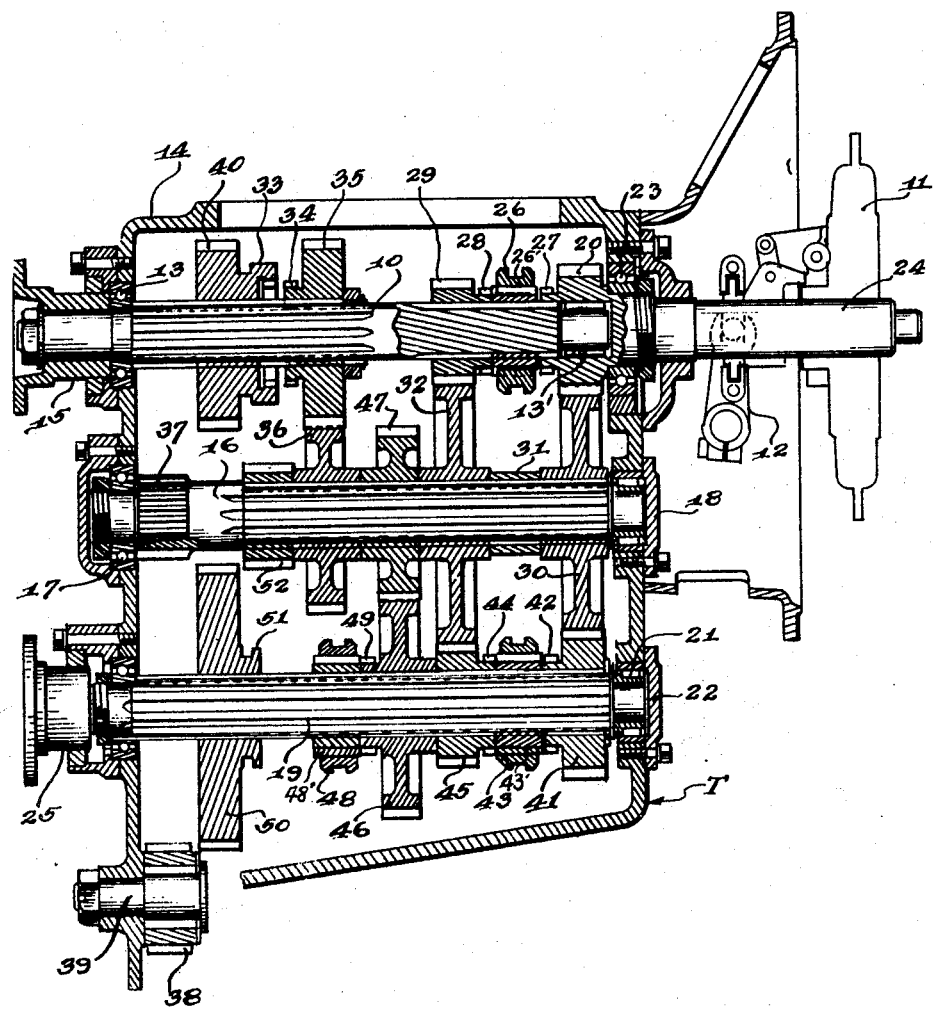

Other objects and advantages of the invention will hereinafter appear, and for purposes of illustration but not of limitation, an embodiment of the invention is shown on the accompanying drawings in which Figure 1 is a side elevation of a trenching machine partly diagrammatic and showing the digging wheel in operative position;

Figure 2 is an enlarged end elevation of the transmission casing showing the power output side; and Figure 3 is a developed vertical sectional elevation of the transmission shown on Figure 2, it being understood that the reverse idler pinion is shown in a different position from what it actually assumes, this being necessary for a clearer understanding of the mechanism.

The illustrative embodiment of the invention comprises a trenching or ditching machine of the wheel type and includes a main frame M supported by a pair of endless track or crawler units C for propelling the machine over the ground. At the rear end portion of the main frame M are elevator rails R to which a digging wheel W is suitably connected and along which the frame of the wheel W may be moved toward and away from digging or excavating position. It will be understood that the digging wheel W includes a series of excavating buckets which, as the machine advances, successively dig into the earth, depositing the excavated material upon a suitable conveyor (not shown) which discharges it laterally of the machine. More detailed illustration and description of the machine is not considered necessary since the same forms no part of the present invention.

Mounted at the forward end of the main frame M is a power plant P such as an internal combustion engine which serves not only to drive the crawlers C but also to drive the digging wheel W.

2

The flow of power from the power plant P is through a transmission T from whence the output is transmitted in any suitable manner such as through a driven shaft D, differential F and digging wheel driving mechanism G. Also from the transmission T, power is transmitted to a secondary transmission S controlled by a lever U to a crawler drive mechanism L through which power is selectively transmitted to the usual driving sprockets on the crawler units C.

Figures 2 and 3 show in detail the transmission T and referring particularly to Figure 3, it will be understood that the power plant P transmits power to a driving shaft 24 through a suitable clutch 11 such, for example, as a disc clutch which may be manually drawn in or out by the actuation of suitable mechanism generally indicated at 12. The output shaft 10 is suitably mounted in an anti-friction bearing 13 in one wall of a transmission casing 14, the opposite end of the shaft 10 being reduced and supported by roller bearings 13' housed within a drive pinion 20. The opposite end of the shaft 10 is provided with a suitable coupling 15 which is connected in any suitable manner to the digging wheel drive shaft 10. Spaced below and to one side of the output shaft 10 (see Figure 2), is a shaft 16 which is mounted in anti-friction bearings 17 in the opposite walls of the casing 14, caps 18 providing covers for the outer ends of the shaft.

Spaced below the countershaft 16 and in substantially vertical alignment with the output shaft 10 is an output shaft 19, the opposite ends of which are mounted in anti-friction bearings 21 in opposite walls of the casing, a cap 22 closing one end thereof.

The output shaft 19 has a collar 25 at one end which is operatively connected as above indicated for driving the traction units or crawlers C. As will hereinafter appear, the digging wheel W which is driven from the output shaft 10 has three forward speeds and one reverse, whereas the output shaft 19 controlling the crawler units has four forward speeds and one reverse. It will further be pointed out that on each of the ouput shafts are gears meshing with gears on the countershaft which is common to the two ouput shafts and some of the gears on the countershaft may be employed to drive either or both output shafts 10 and 19 at the same time.

The drive pinion is mounted in anti-friction bearings 23 in a wall of the casing and is fixed to a driving shaft 24 which, as will be readily understood, derives its power from the power plant P through the clutch mechanism 11. For driving the output shaft 10 which, as above explained, drives the digging wheel W, there is a gear clutch 26 of well-known design which when moved to the right of Figure 3, meshes with teeth 27 integral with the drive pinion 20. Thus by moving the clutch collar 26 into engagement with the teeth 27, a direct drive is established from the drive pinion to the output shaft 10. The clutch collar 26 has internal teeth meshing with external teeth on a carrier gear 26', which in turn is splined to the shaft 10. Thus the clutch collar 26 can be shifted in one direction or the other axially of the shaft 10 relative to the carrier gear 26'. To drive the output shaft 10 through a gear reduction for increasing the power, the clutch collar 26 may be moved to the left of Figure 3 into engagement with teeth 28 integral with a relatively small gear 29 which is loosely mounted on the shaft 10. By that adjustment, the drive from the drive pinion 20 is as follows: the drive pinion meshes with a relatively large gear 30 splined to the countershaft 16 and which is spaced by a sleeve 31 from a gear 32 which is somewhat larger than the gear 30. The gear 32 is likewise splined to the shaft 16 and is in constant mesh with the smaller gear 29 above mentioned. Thus the drive when the clutch collar 26 is in its left-hand position (Figure 3), is from the drive pinion 20, gear 30, shaft 16, gear 32, gear 29 and output shaft 10.

A further drive may be established for the digging wheel W by actuation of a jaw clutch 33 which is splined to the output shaft 10 to the right of Figure 3 into engagement with teeth 34 integral with a gear 35. The gear 35 is free to rotate about the shaft 10 and is in constant mesh with a smaller gear 36 keyed to the countershaft 16. It will thus be evident that when such coupling has been made, the drive is from the drive pinion 20 to the gear 30 with which it is in constant mesh, the countershaft 16 and gears 36 and 35 to the output shaft 10.

On the one end portion of the countershaft 16 is a pinion 37 secured for rotation therewith. The pinion 37 is in constant mesh with an idler gear 38 mounted on a stub shaft 39 carried by the adjacent wall of the transmission casing 14. Attention is called to Figure 2 which shows the arrangement of the idler gear 38 to be slightly above and to one side of the countershaft 16 and in such position that a gear 40 may be shifted into engagement with the gear 38. The gear 40 and jaw clutch 33 are integral. By movement of the gear 40 to the left of Figure 3 so that the teeth thereof are brought into mesh with the gear 38, the rotation of the output shaft 10 is reversed and accordingly the rotation of the digging wheel W is reversed. When such adjustment is made, it will be manifest that the drive is through the drive pinion 20, gear 30, countershaft 16, gear 37, idler gear 38 and through the gear 40 to the output shaft.

The traction or crawler units C which are driven from the output shaft 19 may be driven as follows: the gear 30 meshes with a smaller gear 41 freely rotatable on the output shaft 19. Integral with the gear 41 at one side thereof is a series of clutch teeth 42 with which a jaw clutch 43 is engageable. The jaw clutch 43 rotates with the output shaft 19 and upon actuation thereof into engagement with the clutch teeth 42, it will be manifest that the output shaft 19 and consequently the traction units C are driven from the drive pinion 20, through the gear 30 and through the clutch 43 to the shaft 19.

The clutch 43 is mounted similarly to the clutch 26 upon a carrier gear 43' splined to the shaft 19.

The clutch collar 43 may be moved to the left of Figure 3 to engage the clutch teeth 44 integral with one side of a relatively small gear 45 freely rotatable on the shaft 19. The gear 45 is constantly in mesh with the gear 32 on the countershaft 16. By such adjustment, the output shaft 19 is then driven from the drive pinion 20, through the gear 30, countershaft 16, gears 32 and 45, and through the clutch 43.

It should be here noted that the gears 30 and 32 are common to both output shafts 10 and 19 and either output shaft of both output shafts may be simultaneously driven through common gears.

At one side of the gear 45 is a relatively large gear 46 which is free to rotate on the shaft 19 and meshes with a gear 47 freely rotatable on the countershaft 16. On the opposite side of the gear 46 is a jaw clutch collar 48 which can be moved into operative engagement with clutch teeth 49 integral with the gear 46. The clutch collar 48 is mounted similarly to the clutch 26 on a carrier gear 48' splined to the shaft 19. Thus by actuating the clutch collar 48 to the right of Figure 3, the output shaft 19 is driven through the following chain of gears: the drive pinion 20, gear 30, countershaft 16, and gears 47 and 46 and through the clutch 48 to the shaft 19.

The drive for the output shaft 19 is also effected through a relatively large gear 50 formed with a clutch collar 51 and disposed at one side of the clutch 48. By moving the gear 50 to the right of Figure 3, it may be brought into contact with a relatively small gear 52, secured for rotation to the countershaft 16. In such position, the output shaft 19 is driven from the drive pinion 20, through the gear 30, countershaft 16, small gear 52 and large gear 50. The gear 50 is splined to the output shaft 19.

In order to reverse the operation of the traction or crawler units C, the gear 50 is moved to the left of Figure 3 to bring it into mesh with the idler gear 38. In such event, it will be understood that the drive is through the drive pinion 20, gear 30, countershaft 16, gear 37, idler gear 38 and gear 50 which will be rotated in a direction opposite to that of the drive pinion 20.

For actuating the clutches 43, 48 and 51 is a manual lever 52 suitably connected for selectively actuating the same. A manual lever 53 is suitably connected for selectively actuating the clutches 26 and 33. It will be understood that the casing 14 is closed and filled with oil.

From the above description, it will be manifest that I have produced an exceedingly simple, compact transmission by which two output shafts may be selectively operated at different speeds and in different dirctions of rotation. By employing common gears, the structure is materially simplified and initial as well as maintenance costs substantially reduced.

It is to be understood that numerous changes in details of construction, arrangement and operation may be effected without departing from the spirit of the invention especially as defined in the appended claims.

What I claim is:

1. A transmission adapted for driving the excavating and traction mechanisms of a digging machine, comprising a pair of output shafts adapted to be operatively connected to the excavating and traction mechanisms respectively, a countershaft interposed between said output shafts, gears mounted freely for rotation upon said output shafts respectively, gears fixed for rotation to said countershaft, gears on said countershaft meshing respectively with gears on one or the other output shafts, a drive pinion axially aligned with one output shaft and meshing with a gear on said countershaft, the latter gear meshing with a gear on the other output shaft, and clutches on and fixed for rotation with said output shafts respectively and shiftable into operative engagement with an adjacent gear for establishing drives thereto.

2. A transmission as claimd in claim 1, comprising a pinion fixed to said countershaft, an idler gear meshing with said pinion, a mounting for said idler gear separate from said output and countershafts, and shiftable gear means on said output shafts respectively adapted to be brought into mesh with said idler gear thereby to reverse the direction of drive for either or both of said output shafts.

3. A transmission adapted for driving the excavating and traction mechanisms of a digging machine, comprising a pair of output shafts adapted to be operatively connected to the excavating and traction mechanisms respectively, a countershaft interposed between said output shafts, gears mounted freely for rotation upon said output shafts respectively, gears fixed for rotation to said countershaft, gears on said countershaft meshing respectively with gears on one or the other output shaft, a drive pinion axially aligned with one output shaft and meshing with a gear on said countershaft, the latter gear meshing with a gear on the other output shaft, said drive pinion having an axial socket, a reduced end portion on the output shaft aligned with said drive pinion and extending into said socket, anti-friction bearings in said socket for said reduced shaft portion, and clutches on and fixed for rotation with said output shafts respectively and shiftable into operative engagement with an adjacent gear for establishing drives thereto.

4. A transmission adapted for driving the excavating and traction mechanisms of a digging machine, comprising a pair of output shafts adapted to be operatively connected to the excavating and traction mechanisms respectively, a countershaft interposed between said output shafts, said output shafts and countershafts being arranged in parallel relationship, gears mounted freely for rotation upon said output shafts respectively, gears fixed for rotation to said countershaft, gears on said countershaft meshing respectively with gears on one or the other output shaft, a drive pinion axially aligned with one output shaft and meshing with a gear on said countershaft, the latter gear meshing with a gear on the other output shaft, said drive pinion having an axial socket, a reduced end portion on the output shaft aligned with said drive pinion and extending into said socket, anti-friction bearings in said socket for said reduced shaft portion, and clutches on and fixed for rotation with said output shafts respectively and shiftable into operative engagement with an adjacent gear for establishing drives thereto.

5. A transmission as claimed in claim 4, comprising a pinion fixed to said countershaft, an idler gear constantly in mesh with said pinion and mounted separately from said shafts, a shiftable gear member on each of said output shafts adapted respectively to mesh with said idler gear for reversing the direction of rotation of said output shafts, each of said shiftable gear members being shiftable in an opposite direction into operative engagement with another gear member for driving the respective output shaft in the opposite direction.

6. A transmission adapted for driving the excavating and traction mechanisms of a digging machine, comprising a pair of parallel output shafts adapted to be operatively connected to said mechanisms respectively, a countershaft interposed between and parallel to said output shafts, a drive pinion co-axial with one of said output shafts, a driving connection between said drive pinion and said countershaft, gears on said shafts respectively, arranged so that certain gears on each output shaft mesh with gears on the countershaft, the gears on the countershaft being rotatable therewith and said gears on the output shafts being free to rotate thereon, means for selectively establishing an operative driving connection between each output shaft gear and the respective output shaft, a separately mounted idler gear, a pinion fixed to said countershaft constantly in mesh with said idler gear, and a gear on each of said output shafts shiftable respectively into engagement with said idler gear, thereby selectively to reverse the direction of rotation of one or both of said output shafts.

7. A transmission adapted for driving the excavating and traction mechanisms of a digging machine comprising a pair of parallel output shafts adapted to be operatively connected to said mechanisms respectively, a countershaft disposed between and parallel to said output shafts, a drive pinion in axial alignment with one of said output shafts and having bearing thereon, anti-friction means between said drive pinion and said last output shaft, a plurality of gears fixed for rotation with said countershaft, one of said gears meshing with said drive pinion, a plurality of gears rotatably mounted on each of said output shafts respectively, each of said rotatable gears meshing with adjacent gears on said countershaft, and clutch collars fixed to and shiftable on said output shafts for driving same when shifted into operative engagement with an adjacent output shaft gear.

8. A transmission as claimed in claim 7, comprising a separately mounted gear meshed with the drive pinion, and a gear fixed for rotation on each of said output shafts and adapted to be selectively shifted longitudinally in one direction for operative engagement with said separately mounted gear for rotation of said shafts in the reverse direction, said gears being shiftable longitudinally in the other direction for operative engagement with adjacent gears on the respective output shaft for driving same in the other direction.

9. A transmission adapted for driving the excavating and traction mechanisms of a digging machine, comprising a pair of parallel output shafts adapted to be operatively connected to said mechanisms respectively, a countershaft disposed between and parallel to said output shafts, a drive pinion in axial alignment with one of said output shafts and having bearing thereon, four gears of different diameters fixed for rotation with said countershaft, two gears of different diameters rotatably mounted on one output shaft, three gears of different diameters rotatably mounted on the other output shaft, one of said countershaft gears meshing with said drive pinion, another countershaft gear meshing with gears mounted on both of said output shafts, the other of said countershaft gears each meshing with a gear mounted on said output shafts respectively, clutch collars rotatable with and shiftable on said output shafts respectively for driving same when shifted to operative engagement with an adjacent output shaft gear.

10. A transmission adapted for driving the excavating and traction mechanisms of a digging machine comprising a pair of parallel output shafts adapted to be operatively connected to said mechanisms respectively, a countershaft interposed between and parallel to said output shafts respectively, means in constant engagement with the countershaft for driving same, a plurality of change speed gears on said counter and output shafts respectively, the gears on the countershaft being fixed for rotation therewith, clutch means for selectively establishing driving relation between said gears for operating said output shafts at desired speeds, an additional shaft disposed parallel to said output and countershafts, a gear on said last shaft, and means for establishing a drive from the countershaft through said last gear to one of said output shafts for reversing the drive therefor.

ROBERT N. BENNETT.

REFERENCES CITED

The following references are of record in the file of this patent:

UNITED STATES PATENTS

| Number | Name | Date |
| --- | --- | --- |
| 992,967 | Lever | May 23, 1911 |
| 1,269,944 | Leonard | June 18, 1918 |
| 1,455,169 | Moorhouse | May 15, 1923 |
| 1,482,608 | Hamshaw | Feb. 5, 1924 |
| 2,084,887 | Bennett | June 22, 1937 |
| 2,214,805 | Baker et al | Sept. 17, 1940 |
| 2,290,089 | Bock | July 14, 1942 |